(12) United States Patent
Prusty et al.

(10) Patent No.: US 8,450,407 B2
(45) Date of Patent: May 28, 2013

(54) HEAT AGING-RESISTANT POLYAMIDES WITH FLAME RETARDANCY

(75) Inventors: Manoranjan Prusty, Mannheim (DE); Martin Baumert, Dossenheim (DE); Michael Roth, Lautertal (DE); Uske Klaus, Bad Dürkheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/504,524

(22) PCT Filed: Oct. 18, 2010

(86) PCT No.: PCT/EP2010/065580
§ 371 (c)(1),
(2), (4) Date: Apr. 27, 2012

(87) PCT Pub. No.: WO2011/051121
PCT Pub. Date: May 5, 2011

(65) Prior Publication Data
US 2012/0208937 A1    Aug. 16, 2012

(30) Foreign Application Priority Data

Oct. 27, 2009  (EP) .................................. 09174175

(51) Int. Cl.
*C08K 3/08*  (2006.01)
(52) U.S. Cl.
USPC ............................ 524/439; 524/126; 524/133
(58) Field of Classification Search
USPC ......................... 524/126, 133, 439
See application file for complete search history.

(56) References Cited

U.S. PATENT DOCUMENTS

| 8,268,920 B2 * | 9/2012 | Prusty et al. ................. 524/440 |
| 2005/0014874 A1 | 1/2005 | Hoerold et al. |
| 2005/0250885 A1 | 11/2005 | Mercx et al. |

FOREIGN PATENT DOCUMENTS

| EP | 0592942 A1 | 4/1994 |
| EP | 1498445 A1 | 1/2005 |
| EP | 1500676 A2 | 1/2005 |
| EP | 1683830 A1 | 7/2006 |
| WO | WO-2011051121 A1 | 5/2011 |
| WO | WO-2011051123 A1 | 5/2011 |

OTHER PUBLICATIONS

A. F. Holleman, et al, Lehrbuch der Anorganischen Chemie, 1964, 57.-70. Edition, pp. 166-177.
Houben-Wel, et al. Methoden der organischen Chemie, Bd. 14/1, Georg-Thieme-Verlag, Stuttgard, 1961, pp. 392-406.
International Search Report for PCT/EP2010/065580.
U.S. Appl. No. 13/139,768, filed Sep. 15, 2011, Prusty, Manoranjan.
International Search Report for PCT/EP2010/065580 mailed Jan. 18, 2011.
International Preliminary Report on Patentability for PCT/EP2010/065580 mailed Oct. 28, 2011.

* cited by examiner

*Primary Examiner* — Peter Szekely
(74) *Attorney, Agent, or Firm* — Novak Druce Connolly Bove + Quigg LLP

(57) ABSTRACT

Thermoplastic molding compositions, comprising
A) from 10 to 98% by weight of a polyamide
B) from 0.001 to 20% by weight of iron powder with a particle size of at most 10 μm ($d_{50}$ value)
C) from 1 to 40% by weight of a halogen-free flame retardant from the group of the phosphorus- or nitrogen-containing compounds or P—N condensates, or a mixture of these
D) from 0 to 70% by weight of further additives,
where the total of the percentages by weight of components A) to D) is 100%.

17 Claims, No Drawings

HEAT AGING-RESISTANT POLYAMIDES WITH FLAME RETARDANCY

CROSS-REFERENCE TO RELATED APPLICATIONS

This application is a national stage application (under 35 U.S.C. §371) of PCT/EP2010/065580, filed Oct. 18, 2010, which claims benefit of European application 09174175.1, filed Oct. 27, 2009.

The invention relates to thermoplastic molding compositions, comprising
- A) from 10 to 98% by weight of a polyamide,
- B) from 0.001 to 20% by weight of iron powder with a particle size of at most 10 μm ($d_{50}$ value),
- C) from 1 to 40% by weight of a halogen-free flame retardant from the group of the phosphorus- or nitrogen-containing compounds or P—N condensates, or a mixture of these
- D) from 0 to 70% by weight of further additives, where the total of the percentages by weight of components A) to D) is 100%.

The invention further relates to the use of the molding compositions of the invention for the production of fibers, foils, and moldings of any kind, and also to the resultant moldings.

Thermoplastic polyamides, such as PA6 and PA66, are often used in the form of glassfiber-reinforced molding compositions as materials in the design of components which during their lifetime have exposure to elevated temperatures, with thermooxidative degradation. Although the thermooxidative degradation can be delayed by adding known heat stabilizers it cannot be prevented in the long term, and becomes apparent by way of example in a reduced level of mechanical properties. It is highly desirable to improve the heat-aging resistance (HAR) of polyamides, since this can achieve longer lifetimes for components subject to thermal stress, or can reduce the risk that these will fail. As an alternative, an improved HAR can also permit the use of the components at higher temperatures.

The use of elemental iron powder in polyamides is known from DE-A 26 02 449, JP-A 09/221590, JP-A 2000/86889 (in each case as filler), JP-A 2000/256 123 (as decorative additive), and also WO 2006/074912 and WO 2005/007727 (stabilizers).

EP-A 1 846 506 discloses a combination of Cu-containing stabilizers with iron oxides for polyamides.

The heat-aging resistance of the known molding compositions remains inadequate, in particular over prolonged periods of thermal stress.

The surface of the moldings is not entirely satisfactory, since heat-aging causes porosity, and also blistering.

The more recent EP application, file reference: 08171803.3, proposes combinations of polyethyleneimines with iron powder to improve HAR. Flame retardants are mentioned only in general terms in the abovementioned specifications.

It was therefore an object of the present invention to provide flame-retardant thermoplastic polyamide molding compositions which have improved HAR and have a good surface after heat-aging, and also good mechanical properties.

The molding compositions defined in the introduction have accordingly been found. Preferred embodiments are given in the dependent claims.

The molding compositions of the invention comprise, as component A), from 10 to 98% by weight, preferably from 20 to 97% by weight, and in particular from 25 to 90% by weight, of at least one polyamide.

The polyamides of the molding compositions of the invention generally have an intrinsic viscosity of from 90 to 350 ml/g, preferably from 110 to 240 ml/g, determined in a 0.5% strength by weight solution in 96% strength by weight sulfuric acid at 25° C. to ISO 307.

Preference is given to semicrystalline or amorphous resins with a molecular weight (weight average) of at least 5000, described by way of example in the following U.S. Pat. Nos. 2,071,250, 2,071,251, 2,130,523, 2,130,948, 2,241,322, 2,312,966, 2,512,606, and 3,393,210.

Examples of these are polyamides that derive from lactams having from 7 to 13 ring members, e.g. polycaprolactam, polycaprylolactam, and polylaurolactam, and also polyamides obtained via reaction of dicarboxylic acids with diamines.

Dicarboxylic acids which may be used are alkanedicarboxylic acids having 6 to 12, in particular 6 to 10, carbon atoms, and aromatic dicarboxylic acids. Merely as examples, those that may be mentioned here are adipic acid, azelaic acid, sebacic acid, dodecanedioic acid and terephthalic and/or isophthalic acid.

Particularly suitable diamines are alkanediamines having from 6 to 12, in particular from 6 to 8, carbon atoms, and also m-xylylenediamine (e.g. Ultramid® X17 from BASF SE, where the molar ratio of MXDA to adipic acid is 1:1), di(4-aminophenyl)methane, di(4-aminocyclohexyl)methane, 2,2-di(4-aminophenyl)propane, 2,2-di(4-amino-cyclohexyl)propane, and 1,5-diamino-2-methylpentane.

Preferred polyamides are polyhexamethyleneadipamide, polyhexamethylene-sebacamide, and polycaprolactam, and also nylon-6/6,6 copolyamides, in particular having a proportion of from 5 to 95% by weight of caprolactam units (e.g. Ultramid® C31 from BASF SE).

Other suitable polyamides are obtainable from w-aminoalkylnitriles, e.g. amino-capronitrile (PA 6) and adipodinitrile with hexamethylenediamine (PA 66) via what is known as direct polymerization in the presence of water, for example as described in DE-A 10313681, EP-A 1198491 and EP 922065.

Mention may also be made of polyamides obtainable, by way of example, via condensation of 1,4-diaminobutane with adipic acid at an elevated temperature (nylon-4,6). Preparation processes for polyamides of this structure are described by way of example in EP-A 38 094, EP-A 38 582, and EP-A 39 524.

Other suitable examples are polyamides obtainable via copolymerization of two or more of the abovementioned monomers, and mixtures of two or more polyamides in any desired mixing ratio. Particular preference is given to mixtures of nylon-6,6 with other polyamides, in particular nylon-6/6,6 copolyamides.

Other copolyamides which have proven particularly advantageous are semiaromatic copolyamides, such as PA 6/6T and PA 66/6T, where the triamine content of these is less than 0.5% by weight, preferably less than 0.3% by weight (see EP-A 299 444). Other polyamides resistant to high temperatures are known from EP-A 19 94 075 (PA 6T/6I/MX06).

The processes described in EP-A 129 195 and 129 196 can be used to prepare the preferred semiaromatic copolyamides with low triamine content.

The following list, which is not comprehensive, comprises the polyamides A) mentioned and other polyamides A) for the purposes of the invention, and the monomers comprised:

AB polymers:
PA 4 Pyrrolidone
PA 6 ε-Caprolactam
PA 7 Enantholactam
PA 8 Caprylolactam
PA 9 9-Aminopelargonic acid
PA 11 11-Aminoundecanoic acid
PA 12 Laurolactam
AA/BB polymers:
PA 46 Tetramethylenediamine, adipic acid
PA 66 Hexamethylenediamine, adipic acid
PA 69 Hexamethylenediamine, azelaic acid
PA 610 Hexamethylenediamine, sebacic acid
PA 612 Hexamethylenediamine, decanedicarboxylic acid
PA 613 Hexamethylenediamine, undecanedicarboxylic acid
PA 1212 1,12-Dodecanediamine, decanedicarboxylic acid
PA 1313 1,13-Diaminotridecane, undecanedicarboxylic acid
PA 6T Hexamethylenediamine, terephthalic acid
PA MXD6 m-Xylylenediamine, adipic acid
PA 9 T 1,9-Nonanediamine, adipic acid
PA 61 Hexamethylenediamine, isophthalic acid
PA 6-3-T Trimethylhexamethylenediamine, terephthalic acid
PA 6/6T (see PA 6 and PA 6T)
PA 6/66 (see PA 6 and PA 66)
PA 6/12 (see PA 6 and PA 12)
PA 66/6/610 (see PA 66, PA 6 and PA 610)
PA 6I/6T (see PA 61 and PA 6T)
PA PACM 12 Diaminodicyclohexylmethane, laurolactam
PA 6I/6T/PACM as PA 6I/6T+diaminodicyclohexylmethane
PA 12/MACMI Laurolactam, dimethyldiaminodicyclohexylmethane, isophthalic acid
PA 12/MACMT Laurolactam, dimethyldiaminodicyclohexylmethane, terephthalic acid
PA PDA-T Phenylenediamine, terephthalic acid The molding compositions of the invention comprise, as component B), from 0.001 to 20% by weight, preferably from 0.05 to 10% by weight, and in particular from 0.1 to 5% by weight, of iron powder with a particle size of at most 10 μm ($d_{50}$ value) which is obtainable via thermal decomposition of pentacarbonyl-iron.

Iron occurs in a number of allotropes:
1. α-Fe (ferrite) forms space-centered cubic lattices, is magnetizable, dissolves a small amount of carbon, and occurs in pure iron up to 928° C. At 770° C. (Curie temperature) it loses its ferromagnetic properties and becomes paramagnetic; iron in the temperature range from 770 to 928° C. is also termed β-Fe. At normal temperature and at a pressure of at least 13 000 MPa, α-Fe becomes what is known as ε-Fe with a reduction of about 0.20 cm$^3$/mol in volume, whereupon density increases from 7.85 to 9.1 (at 20 000 MPa).
2. γ-Fe (austenite) forms face-centered cubic lattices, is nonmagnetic, dissolves a large amount of carbon, and is observable only in the temperature range from 928 to 1398° C.
3. δ-Fe, space-centered, exists at from 1398° C. to the melting point of 1539° C.

Metallic iron is generally silver-white, density 7.874 (heavy metal), m.p. 1539° C., boiling point 2880° C.; specific heat (from 18 to 100° C.) about 0.5 g$^{-1}$ K$^{-1}$, tensile strength from 220 to 280 N/mm$^2$. The values apply to chemically pure iron.

Industrial production of iron uses smelting of iron ores, iron slags, calcined pyrites, or blast-furnace dust, and resmelting of scrap and alloy.

The iron powder of the invention is produced via thermal decomposition of pentacarbonyliron, preferably at temperatures of from 150° C. to 350° C. The particles thus obtainable have preferably spherical shape, therefore being spherical or almost spherical (another term used being spherolitic).

Preferred iron powder has the particle size distribution described below; particle size distribution here is determined by means of laser scattering in very dilute aqueous suspension (e.g. using a Beckmann LS13320). The particle size (and distribution) described hereinafter can optionally be obtained via grinding or/and sieving. $d_{xx}$ here means that XX % of the total volume of the particles is smaller than the stated value.

$d_{50}$ values: at most 10 μm, preferably from 1.6 to 8 μm, in particular from 2.9 to 7.5 μm, very particularly from 3.4 to 5.2 μm $d_{10}$ values: preferably from 1 to 5 μm, in particular from 1 to 3 μm, and very particularly from 1.4 to 2.7 μm $d_{90}$ values: preferably from 3 to 35 μm, in particular from 3 to 12 μm, and very particularly from 6.4 to 9.2 μm.

Component B) preferably has iron content of from 97 to 99.8 g/100 g, preferably from 97.5 to 99.6 g/100 g. Content of other metals is preferably below 1000 ppm, in particular below 100 ppm, and very particularly below 10 ppm.

Fe content is usually determined via infrared spectroscopy.

C content is preferably from 0.01 to 1.2 g/100 g, preferably from 0.05 to 1.1 g/100 g and in particular from 0.4 to 1.1 g/100 g. This C content corresponds in the preferred iron powders to powders which are not reduced with hydrogen after thermal decomposition.

C content is usually determined by combustion of the sample in a stream of oxygen and then using IR to detect the resultant $CO_2$ gas (by means of a Leco CS230 or CS-mat 6250 from Juwe) by a method based on ASTM E1019.

Nitrogen content is preferably at most 1.5 g/100 g, preferably from 0.01 to 1.2 g/100 g. Oxygen content is preferably at most 1.3 g/100 g, preferably from 0.3 to 0.65 g/100 g. N and O are determined via heating of the specimen to about 2100° C. in graphite furnace. The oxygen obtained from the specimen here is converted to CO and measured by way of an IR detector. The N liberated under the reaction conditions from the N-containing compounds is discharged with the carrier gas and detected and recorded by means of TCD (Thermal Conductivity Detector) (both methods based on ASTM E1019).

Tap density is preferably from 2.5 to 5 g/cm$^3$, in particular from 2.7 to 4.4 g/cm$^3$. This generally means the density when the powder is, for example, charged to the container and compacted by vibration. Iron powder to which further preference is given can have been surface-coated with iron phosphate, with iron phosphite, or with $SiO_2$.

BET surface area to DIN ISO 9277 is preferably from 0.1 to 10 m$^2$/g, in particular from 0.1 to 5 m$^2$/g, preferably from 0.2 to 1 m$^2$/g and in particular from 0.4 to 1 m$^2$/g.

In order to achieve particularly good dispersion of the iron particles, a masterbatch may be used, involving a polymer. Suitable polymers for this purpose are polyolefins, polyesters, or polyamides, and it is preferable here that the masterbatch polymer is the same as component A). The mass fraction of the iron in the polymer is generally from 15 to 80% by mass, preferably from 20 to 40% by mass.

The molding compositions of the invention comprise, as component C), from 1 to 40% by weight, preferably from 2 to 30% by weight, and in particular from 5 to 20 by weight, of a halogen-free flame retardant selected from the group of the nitrogen-containing or phosphorus-containing compounds, or of the P—N condensates, or a mixture of these.

Melamine cyanurate is preferably suitable according to the invention (component C) and is a reaction product from preferably equimolar amounts of melamine (formula I) and cyanuric acid or isocyanuric acid (formulae Ia and Ib)

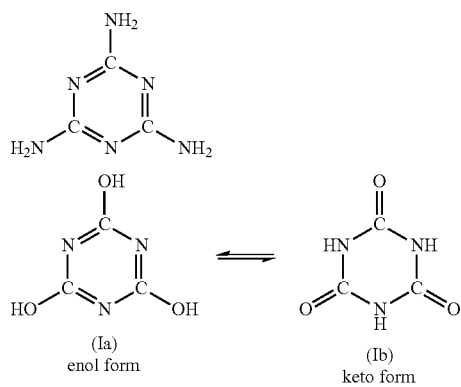

(Ia) enol form (Ib) keto form

It is obtained, for example, via reaction of aqueous solutions of the starting compounds at from 90 to 100° C. The product available commercially is a white powder with a $d_{50}$ average grain size of from 1.5 to 7 μm.

Other suitable compounds (also often termed salts or adducts) are melamine, melamine borate, melamine oxalate, melamine phosphate (prim.), melamine phosphate (sec.) and melamine pyrophosphate (sec.), melamine neopentyl glycol borate and polymeric melamine phosphate (CAS No. 56386-64-2).

Suitable guanidine salts are

|  | CAS No. |
|---|---|
| G carbonate | 593-85-1 |
| G cyanurate prim. | 70285-19-7 |
| G phosphate prim. | 5423-22-3 |
| G phosphate sec. | 5423-23-4 |
| G sulfate prim. | 646-34-4 |
| G sulfate sec. | 594-14-9 |
| Guanidine pentaerythritol borate | N.A. |
| Guanidine neopentyl glycol borate | N.A. |
| Urea phosphate green | 4861-19-2 |
| Urea cyanurate | 57517-11-0 |
| Ammelin | 645-92-1 |
| Ammelid | 645-93-2 |
| Melem | 1502-47-2 |
| Melon | 32518-77-7 |
| Melam | 3576-88-3 |

For the purposes of the present invention the compounds include both benzoguanamine itself and its adducts or salts, and also the derivatives substituted on nitrogen and their adducts or salts.

Another suitable compound is ammonium polyphosphate $(NH_4PO_3)_n$, where n is from about 200 to 1000, preferably from 600 to 800, and tris(hydroxyethyl) isocyanurate (THEIC) of the formula (II)

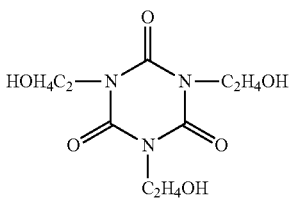

or its reaction products with aromatic carboxylic acids $Ar(COOH)_m$, where these may optionally be present in mixtures with one another, where Ar is a mono-, bi- or trinuclear aromatic six-membered ring system and m is 2, 3 or 4.

Examples of suitable carboxylic acids are phthalic acid, isophthalic acid, terephthalic acid, benzene-1,3,5-tricarboxylic acid, benzene-1,2,4-tricarboxylic acid, pyromellitic acid, mellophanic acid, prehnitic acid, 1-naphthoic acid, 2-naphthoic acid, naphthalenedicarboxylic acids, and anthracenecarboxylic acids.

They are prepared by reacting the tris(hydroxyethyl) isocyanurate with the acids, or with their alkyl esters or their halides in accordance with the process of EP-A 584 567.

Reaction products of this type are a mixture of monomeric and oligomeric esters which may also have crosslinking. The degree of oligomerization is usually from 2 to about 100, preferably from 2 to 20. Preference is given to the use of THEIC and/or its reaction products in mixtures with phosphorus-containing nitrogen compounds, in particular $(NH_4PO_3)_n$ or melamine pyrophosphate or polymeric melamine phosphate. The mixing ratio, for example of $(NH_4PO_3)_n$ to THEIC, is preferably 90-50:10-50% by weight, in particular 80-50:50-20% by weight, based on the mixture of components B) of this type.

Other suitable compounds are benzoguanamine compounds of the formula (III):

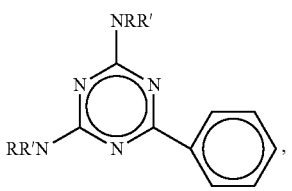

where R and R' are straight-chain or branched alkyl radicals having from 1 to 10 carbon atoms, preferably hydrogen and in particular their adducts with phosphoric acid, boric acid and/or pyrophosphoric acid.

Preference is also given to allantoin compounds of the formula (IV)

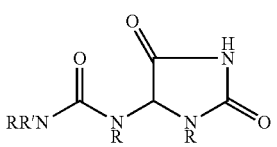

where R and R' are as defined in formula III, and also to the salts of these with phosphoric acid, boric acid and/or pyrophosphoric acid, and also to glycolurils of the formula (V) and to their salts with the abovementioned acids

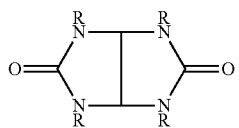

(V)

where R is as defined in formula (III).

Suitable products are obtainable commercially or in accordance with DE-A 196 14 424.

The cyanoguanidine (formula VI) which can be used according to the invention is obtained, for example, by reacting calcium cyanamide with carbonic acid, whereupon the cyanamide produced dimerizes at a pH of from 9 to 10 to give cyanoguanidine.

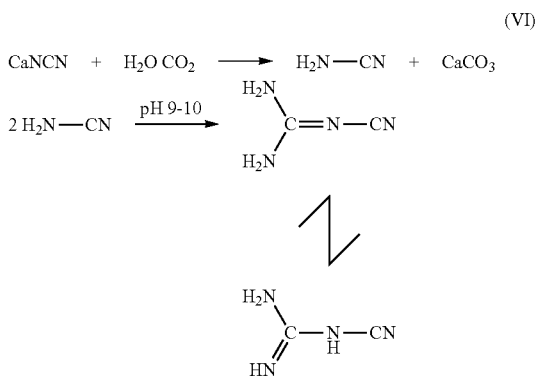

(VI)

The product obtainable commercially is a white powder with a melting point of from 209° C. to 211° C.

Preferred phosphorus-containing compounds are phosphinic salts of the formula (I) and/or diphosphinic salts of the formula (II) and/or their polymers

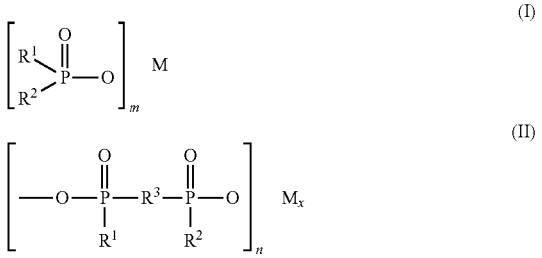

(I)

(II)

where the definitions of the substituents are as follows:

$R^1$ and $R^2$ are hydrogen or $C_1$-$C_6$-alkyl, preferably $C_1$-$C_4$-alkyl, linear or branched, e.g. methyl, ethyl, n-propyl, isopropyl, n-butyl, tert-butyl, n-pentyl; phenyl; where at least one radical $R^1$ or $R^2$ is preferably hydrogen and in particular $R^1$ and $R^2$ are hydrogen;

$R^3$ is $C_1$-$C_{10}$-alkylene, linear or branched, e.g. methylene, ethylene, n-propylene, isopropylene, n-butylene, tert-butylene, n-pentylene, n-octylene, n-dodecylene; arylene, e.g. phenylene, naphthylene; alkylarylene, e.g. methylphenylene, ethylphenylene, tert-butylphenylene, methylnaphthylene, ethylnaphthylene, tert-butylnaphthylene; arylalkylene, e.g. phenylmethylene, phenylethylene, phenylpropylene, phenylbutylene;

M is an alkaline earth metal or alkali metal, Al, Zn, Fe, boron;

m is a whole number from 1 to 3;

n is a whole number of 1 and 3, and x is 1 or 2.

Particular preference is given to compounds of the formula II in which $R^1$ and $R^2$ are hydrogen, where M is preferably Zn or Al, and very particular preference is given to calcium phosphinate.

Products of this type are available commercially, for example in the form of calcium phosphinate.

Suitable salts of the formula I or II in which only one radical $R^1$ or $R^2$ is hydrogen are by way of example salts of phenylphosphinic acid, preference being given to the Na and/or Ca salts thereof.

Particular preference is given to compounds of the formula II in which $R^1$ and $R^2$ are ethyl radicals, where M is preferably Zn or Ca, and Al diethylphosphinate is particularly preferred. Particular preference is given to Al diethylphosphinate in a mixture with melamine cyanurate and/or melamine polyphosphate (from 3:1 to 1.5:1) as flame retardant system.

These materials preferably comprise up to 10% by weight, preferably up to 6% by weight (based on 100% by weight of the above mixture) of a borate as synergist.

Suitable metal borates are borates of metals of the 1st to 3rd main group, and also of the 1st to 8th transition group of the Periodic Table of the Elements, preference being given to anhydrous zinc borate or zinc borate of the general formula $$2Zn_{0.3}B_2O_3 \cdot xH_2O$$

in which x is from 3.3 to 3.7. This zinc borate is in essence stable at the high processing temperatures used for the semi-aromatic polyamides, and has only insignificant tendency toward elimination of the water of hydration. Accordingly, zinc borates with a higher proportion of water of hydration are generally less suitable as synergist. It is also possible to use a mixture of metal borates with metal oxides, in any desired mixing ratio.

The phosphorus-containing compounds of component C) are preferably organic and inorganic compounds which comprise phosphorus and in which the valence state of the phosphorus is from −3 to +5. The valence state is the "oxidation state" as set out in Lehrbuch der Anorganischen Chemie [Textbook of inorganic chemistry] from A. F. Hollemann and E. Wiberg, Walter des Gruyter and Co. (1964, 57th to 70th edition), pages 166 to 177. Phosphorus compounds of the valence states from −3 to +5 derive from phosphine (−3), diphosphine (−2), phosphine oxide (−1), elemental phosphorus (+0), hypophosphorous acid (+1), phosphorous acid (+3), hypodiphosphoric acid (+4) and phosphoric acid (+5).

Only a few examples will be mentioned from the large number of phosphorus-containing compounds.

Examples of phosphorus compounds of the phosphine class, which have the valence state −3, include aromatic phosphines, such as triphenylphosphine, tritolylphosphine, trinonylphosphine, trinaphthylphosphine and trisnonylphenylphosphine. Triphenyl-phosphine is particularly suitable.

Examples of phosphorus compounds of the diphosphine class, having the valence state −2, include tetraphenyldiphosphine and tetranaphthyldiphosphine. Tetranaphthyldiphosphine is particularly suitable.

Phosphorus compounds of the valence state −1 derive from phosphine oxide.

Phosphine oxides of the general formula (III)

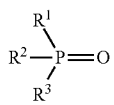

are suitable where $R^1$, $R^2$ and $R^3$ are identical or different alkyl, aryl, alkylaryl or cycloalkyl groups having from 8 to 40 carbon atoms.

Examples of phosphine oxides are triphenylphosphine oxide, tritolylphosphine oxide, trisnonylphenylphosphine oxide, tricyclohexylphosphine oxide, tris(n-butyl)phosphine oxide, tris(n-hexyl)phosphine oxide, tris(n-octyl)phosphine oxide, tris(cyanoethyl)phosphine oxide, benzylbis(cyclohexyl)phosphine oxide, benzylbisphenylphosphine oxide and phenylbis(n-hexyl)phosphine oxide. Other preferred compounds are oxidized reaction products of phosphine with aldehydes, in particular of tert-butylphosphine with glyoxal. Particular preference is given to the use of triphenylphosphine oxide, tricyclohexylphosphine oxide, tris(n-octyl) phosphine oxide or tris(cyanoethyl)phosphine oxide.

Other suitable compounds are triphenylphosphine sulfide and its derivatives as described above for phosphine oxides.

Phosphorus of valence state +0 is elemental phosphorus. Red phosphorus and black phosphorus can be used. Red phosphorus is preferred.

Examples of phosphorus compounds of the "oxidation state" +1 are hypophosphites of purely organic type, e.g. organic hypophosphites such as cellulose hypophosphite esters and esters of hypophosphorous acids with diols, e.g. that of 1,10-dodecyldiol. It is also possible to use substituted phosphinic acids and anhydrides of these, e.g. diphenylphosphinic acid. Other possible compounds are diphenylphosphinic acid, di-p-tolylphosphinic acid and dicresylphosphinic anhydride. Compounds such as the bis(diphenylphosphinic) esters of hydroquinone, ethylene glycol and propylene glycol, inter alia, may also be used. Other suitable compounds are aryl(alkyl)phosphinamides, such as the dimethylamide of diphenylphosphinic acid, and sulfonamidoaryl(alkyl)-phosphinic acid derivatives, such as p-tolylsulfonamidodiphenylphosphinic acid.

Preference is given to use of the bis(diphenylphosphinic) ester of hydroquinone or of ethylene glycol, or the bis(diphenylphosphinate) of hydroquinone.

Phosphorus compounds of the oxidation state +3 derive from phosphorous acid. Suitable compounds are cyclic phosphonates which derive from pentaerythritol, neopentyl glycol or pyrocatechol, an example being

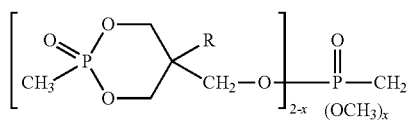

where R is a $C_1$-$C_4$-alkyl radical, preferably a methyl radical, x=0 or 1 (Amgard® P 45 from Albright & Wilson).

Phosphorus of the valence state +3 is also present in triaryl (alkyl) phosphites, such as triphenyl phosphite, tris(4-decylphenyl) phosphite, tris(2,4-di-tert-butylphenyl) phosphite and phenyl didecyl phosphite and so on. However, it is also possible to use diphosphites, such as propylene glycol 1,2-bis(diphosphite) or cyclic phosphites which derive from pentaerythritol, from neopentyl glycol or from pyrocatechol.

Particular preference is given to neopentyl glycol methylphosphonate and neopentyl glycol methyl phosphite, and also to pentaerythritol dimethyldiphosphonate and dimethyl pentaerythritol diphosphite.

Phosphorus compounds of oxidation state +4 which may be used are particularly hypodiphosphates, such as tetraphenyl hypodiphosphate and bisneopentyl hypodiphosphate.

Phosphorus compounds of oxidation state +5 which may be used are particularly alkyl- and aryl-substituted phosphates. Examples of these are phenyl bisdodecyl phosphate, phenyl ethyl hydrogenphosphate, phenyl bis(3,5,5-trimethylhexyl) phosphate, ethyl diphenyl phosphate, 2-ethylhexyl ditolyl phosphate, diphenyl hydrogenphosphate, bis(2-ethylhexyl) p-tolyl phosphate, tritolyl phosphate, bis(2-ethylhexyl) phenyl phosphate, di(nonyl) phenyl phosphate, phenyl methyl hydrogenphosphate, didodecyl p-tolyl phosphate, p-tolylbis(2,5,5-trimethylhexyl) phosphate and 2-ethylhexyl diphenyl phosphate. Particularly suitable phosphorus compounds are those in which each radical is aryloxy. Very particularly suitable compounds are triphenyl phosphate and resorcinol bis(diphenyl phosphate) and its ring-substituted derivatives of the general formula V (RDPs):

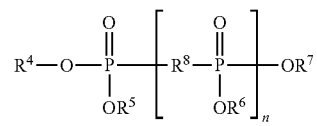

where the definitions of the substituents are as follows:
$R^4$-$R^7$ are aromatic radicals having from 6 to 20 carbon atoms, preferably phenyl, which may have substitution by alkyl groups having from 1 to 4 carbon atoms, preferably methyl,
$R^8$ is a bivalent phenol radical, preferably

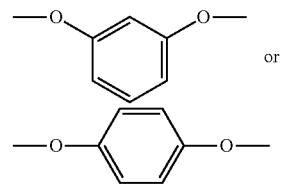

and
n an average value of from 0.1 to 100, preferably from 0.5 to 50, in particular from 0.8 to 10 and very particularly from 1 to 5.

Due to the process used for their manufacture, RDP products available commercially under the trade name Fyroflex® or Fyrol®-RDP (Akzo) and also CR 733-S (Daihachi) are mixtures of about 85% of RDP (n=1) with about 2.5% of triphenyl phosphate and also about 12.5% of oligomeric fractions in which the degree of oligomerization is mostly less than 10.

It is also possible to use cyclic phosphates. Of these, diphenyl pentaerythritol diphosphate and phenyl neopentyl phosphate are particularly suitable.

Besides the low-molecular-weight phosphorus compounds mentioned above, it is also possible to use oligomeric or polymeric phosphorus compounds.

Polymeric, halogen-free organic phosphorus compounds of this type with phosphorus in the polymer chain are produced, for example, in the preparation of pentacyclic unsaturated phosphine dihalides, as described, for example, in DE-A 20 36 173. The molecular weight of the polyphospholine oxides, measured by vapor pressure osmometry in dimethylformamide, should be in the range from 500 to 7000, preferably from 700 to 2000.

Phosphorus here has the oxidation state −1.

It is also possible to use inorganic coordination polymers of aryl(alkyl)phosphinic acids, such as poly-β-sodium(I) methylphenylphosphinate. Their preparation is given in DE-A 31 40 520. Phosphorus has the oxidation number +1.

Halogen-free polymeric phosphorus compounds of this type may also be produced by the reaction of a phosphonic acid chloride, such as phenyl-, methyl-, propyl-, styryl- or vinylphosphonyl dichloride, with dihydric phenols, such as hydroquinone, resorcinol, 2,3,5-trimethylhydroquinone, bisphenol A, or tetramethylbisphenol A.

Other halogen-free polymeric phosphorus compounds which may be present in the inventive molding compositions are prepared by reacting phosphorus oxytrichloride or phosphoric ester dichlorides with a mixture of mono-, di- or trihydric phenols and other compounds carrying hydroxy groups (cf. Houben-Weyl-Müller, Thieme-Verlag, Stuttgart, Germany, Organische Phosphorverbindungen Part II (1963)). It is also possible to produce polymeric phosphonates via transesterification reactions of phosphonic esters with dihydric phenols (cf. DE-A 29 25 208) or via reactions of phosphonic esters with diamines, or with diamides or hydrazides (cf. U.S. Pat. No. 4,403,075). The inorganic compound poly(ammonium phosphate) may also be used.

It is also possible to use oligomeric pentaerythritol phosphites and the corresponding phosphates and phosphonates in accordance with EP-B 8 486, e.g. Mobil Antiblaze® 19 (registered trademark of Mobil Oil).

Preference is further given to phosphorus compounds of the general formula VI another, are a methyl radical, preference is given to those compounds C) in which the radicals $R^1$, $R^5$, $R^6$, $R^{10}$, $R^{11}$, $R^{15}$, $R^{16}$, $R^{20}$ represent at least one methyl radical in ortho-position with respect to the oxygen of the phosphate group. Preference is further given to compounds C) in which there is one methyl group, preferably in ortho-position, per aromatic ring, and the other radicals are hydrogen.

Substituents $SO_2$ and S are particularly preferred, and very particular preference is also given to $C(CH_3)_2$ for X in above formula (VI).

n is preferably an average value of from 0.5 to 5, in particular from 0.7 to 2, and in particular ≈1.

n is given as average value because of the process for producing the compounds listed above, the degree of oligomerization mostly being smaller than 10, and the proportions of triphenyl phosphate present being small (mostly <5 by weight), but this differs from batch to batch. The compounds C) are available commercially as CR-741 from Daihachi.

Other suitable compounds are P—N condensates, particularly those described in WO 2002/96976.

Particular preference is given to combinations C) which are mixtures of phosphorus- and nitrogen-containing compounds, preferred mixing ratios being from 1:10 to 10:1, preferably from 1:9 to 9:1.

The molding compositions of the invention can comprise, as component D), up to 70% by weight, preferably up to 50% by weight, of further additives.

Fibrous or particulate fillers D1) that may be mentioned are carbon fibers, glass fibers, glass beads, amorphous silica, calcium silicate, calcium metasilicate, magnesium carbonate, kaolin, chalk, powdered quartz, mica, barium sulfate, and feldspar, and the amounts of these that can be used are from 1 to 50% by weight, in particular from 1 to 40% by weight, preferably from 10 to 40% by weight.

Preferred fibrous fillers that may be mentioned are carbon fibers, aramid fibers, and potassium titanate fibers, particular preference being given to glass fibers in the form of E glass. These can be used as rovings or in the commercially available forms of chopped glass.

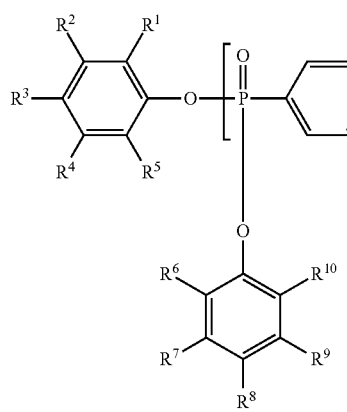
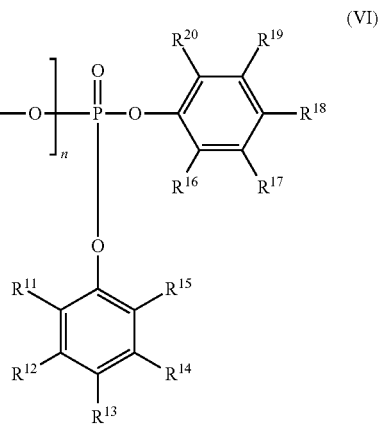

(VI)

where the definitions of the substituents are as follows:
$R^1$ to $R^{20}$, independently of one another, are hydrogen, or a linear or branched alkyl group having up to 6 carbon atoms n is an average value from 0.5 to 50, and X is a single bond, C=O, S, $SO_2$, $C(CH_3)_2$.

Preferred compounds C) are those in which $R^1$ to $R^{20}$, independently of one another, are hydrogen and/or a methyl radical. In the event that $R^1$ to $R^{20}$, independently of one The fibrous fillers may have been surface-pretreated with a silane compound to improve compatibility with the thermoplastic.

Suitable silane compounds have the general formula:

$$(X-(CH_2)_n)_k-Si-(O-C_mH_{2m+1})_{4-k}$$

where the definitions of the substituents are as follows:

X $NH_2$—,

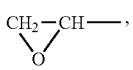

HO—, n is a whole number from 2 to 10, preferably 3 to 4, m is a whole number from 1 to 5, preferably 1 to 2, and k is a whole number from 1 to 3, preferably 1.

Preferred silane compounds are aminopropyltrimethoxysilane, aminobutyltrimethoxysilane, aminopropyltriethoxysilane and aminobutyltriethoxysilane, and also the corresponding silanes which comprise a glycidyl group as substituent X.

The amounts of the silane compounds generally used for surface-coating are from 0.01 to 2% by weight, preferably from 0.025 to 1.0% by weight and in particular from 0.05 to 0.5% by weight (based on E)).

Acicular mineral fillers are also suitable.

For the purposes of the invention, acicular mineral fillers are mineral fillers with strongly developed acicular character. An example is acicular wollastonite. The mineral preferably has an L/D (length to diameter) ratio of from 8:1 to 35:1, preferably from 8:1 to 11:1. The mineral filler may optionally have been pretreated with the abovementioned silane compounds, but the pretreatment is not essential.

Other fillers which may be mentioned are kaolin, calcined kaolin, wollastonite, talc and chalk, and also lamellar or acicular nanofillers, the amounts of these preferably being from 0.1 to 10%. Materials preferred for this purpose are boehmite, bentonite, montmorillonite, vermiculite, hectorite, and laponite. The lamellar nanofillers are organically modified by prior-art methods, to give them good compatibility with the organic binder. Addition of the lamellar or acicular nanofillers to the inventive nanocomposites gives a further increase in mechanical strength.

The molding compositions of the invention can comprise, as component D2), from 0.05 to 3% by weight, preferably from 0.1 to 1.5% by weight, and in particular from 0.1 to 1% by weight, of a lubricant.

Preference is given to the salts of Al, of alkali metals, or of alkaline earth metals, or esters or amides of fatty acids having from 10 to 44 carbon atoms, preferably having from 12 to 44 carbon atoms.

The metal ions are preferably alkaline earth metal and Al, particular preference being given to Ca or Mg.

Preferred metal salts are Ca stearate and Ca montanate, and also Al stearate, and a mixture of Al distearate with Al tristearate (Alugel® 30DF from Baerlocher).

It is also possible to use a mixture of various salts, in any desired mixing ratio.

The carboxylic acids can be monobasic or dibasic. Examples which may be mentioned are pelargonic acid, palmitic acid, lauric acid, margaric acid, dodecanedioic acid, behenic acid, and particularly preferably stearic acid, capric acid, and also montanic acid (a mixture of fatty acids having from 30 to 40 carbon atoms).

The aliphatic alcohols can be monohydric to tetrahydric. Examples of alcohols are n-butanol, n-octanol, stearyl alcohol, ethylene glycol, propylene glycol, neopentyl glycol, pentaerythritol, preference being given to glycerol and pentaerythritol.

The aliphatic amines can be mono- to tribasic. Examples of these are stearylamine, ethylenediamine, propylenediamine, hexamethylenediamine, di(6-aminohexyl)amine, particular preference being given to ethylenediamine and hexamethylenediamine. Preferred esters or amides are correspondingly glycerol distearate, glycerol tristearate, ethylenediamine distearate, glycerol monopalmitate, glycerol trilaurate, glycerol monobehenate, and pentaerythritol tetrastearate.

It is also possible to use a mixture of various esters or amides, or of esters with amides in combination, in any desired mixing ratio.

The molding compositions of the invention can comprise, as component D3), from 0.05 to 3% by weight, preferably from 0.1 to 1.5% by weight, and in particular from 0.1 to 1% by weight, of a copper stabilizer, preferably of a Cu(I) halide, in particular in a mixture with an alkali metal halide, preferably KI, in particular in the ratio 1:4, or of a sterically hindered phenol, or a mixture of these.

Preferred salts of monovalent copper used are cuprous acetate, cuprous chloride, cuprous bromide, and cuprous iodide. The materials comprise these in amounts of from 5 to 500 ppm of copper, preferably from 10 to 250 ppm, based on polyamide.

The advantageous properties are in particular obtained if the copper is present with molecular distribution in the polyamide. This is achieved if a concentrate comprising the polyamide, and comprising a salt of monovalent copper, and comprising an alkali metal halide in the form of a solid, homogeneous solution is added to the molding composition. By way of example, a typical concentrate is composed of from 79 to 95% by weight of polyamide and from 21 to 5% by weight of a mixture composed of copper iodide or copper bromide and potassium iodide. The copper concentration in the solid homogeneous solution is preferably from 0.3 to 3% by weight, in particular from 0.5 to 2% by weight, based on the total weight of the solution, and the molar ratio of cuprous iodide to potassium iodide is from 1 to 11.5, preferably from 1 to 5.

Suitable polyamides for the concentrate are homopolyamides and copolyamides, in particular nylon-6 and nylon-6,6.

Suitable sterically hindered phenols D3) are in principle all of the compounds which have a phenolic structure and which have at least one bulky group on the phenolic ring.

It is preferable to use, for example, compounds of the formula

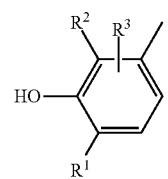

where:

$R^1$ and $R^2$ are an alkyl group, a substituted alkyl group, or a substituted triazole group, and where the radicals $R^1$ and $R^2$ may be identical or different, and $R^3$ is an alkyl group, a substituted alkyl group, an alkoxy group, or a substituted amino group.

Antioxidants of the abovementioned type are described by way of example in DE-A 27 02 661 (U.S. Pat. No. 4,360,617).

Another group of preferred sterically hindered phenols is provided by those derived from substituted benzenecarboxylic acids, in particular from substituted benzenepropionic acids.

Particularly preferred compounds from this class are compounds of the formula

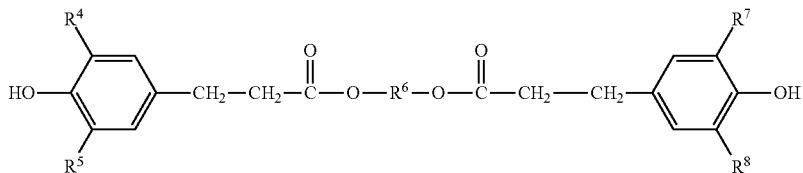

where $R^4$, $R^5$, $R^7$, and $R^8$, independently of one another, are $C_1$-$C_8$-alkyl groups which themselves may have substitution (at least one of these being a bulky group), and $R^6$ is a divalent aliphatic radical which has from 1 to 10 carbon atoms and whose main chain may also have C—O bonds.

Preferred compounds corresponding to these formulae are

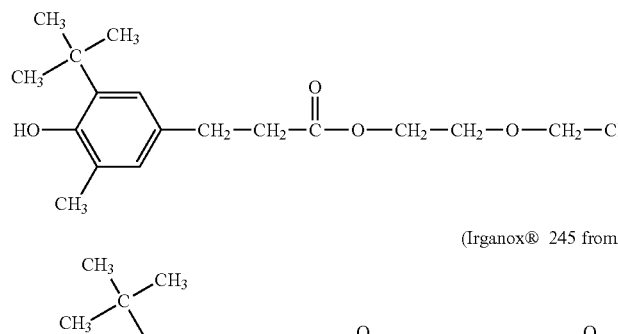

(Irganox® 245 from Ciba-Geigy)

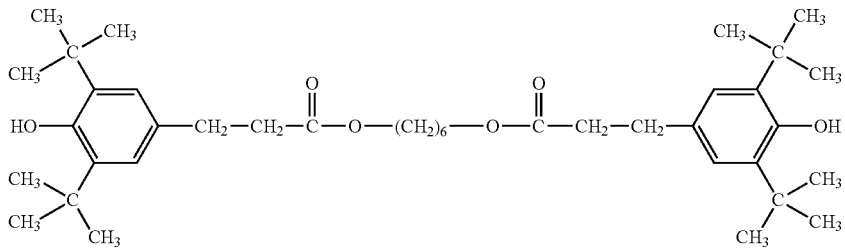

(Irganox® 249 from Ciba-Geigy)

All of the following should be mentioned as examples of sterically hindered phenols:

2,2'-methylenebis(4-methyl-6-tert-butylphenol), 1,6-hexanediol bis[3-(3,5-di-tert-butyl-4-hydroxyphenyl) propionate], pentaerythrityl tetrakis[3-(3,5-di-tert-butyl-4-hydroxy-phenyl) propionate], distearyl 3,5-di-tert-butyl-4-hydroxybenzylphosphonate, 2,6,7-trioxa-1-phosphabicyclo[2.2.2]oct-4-ylmethyl 3,5-di-tert-butyl-4-hydroxyhydrocinnamate, 3,5-di-tert-butyl-4-hydroxyphenyl-3,5-distearylthiotriazylamine, 2-(2'-hydroxy-3'-hydroxy-3',5'-di-tert-butylphenyl)-5-chlorobenzotriazole, 2,6-di-tert-butyl-4-hydroxymethylphenol, 1,3,5-trimethyl-2,4,6-tris(3,5-di-tert-butyl-4-hydroxy-benzyl)benzene, 4,4'-methylenebis(2,6-di-tert-butylphenol), 3,5-di-tert-butyl-4-hydroxy-benzyldimethylamine.

Compounds which have proven particularly effective and which are therefore used with preference are 2,2'-methylenebis(4-methyl-6-tert-butylphenol), 1,6-hexanediol bis(3,5-di-tert-butyl-4-hydroxyphenyl)propionate (Irganox® 259), pentaerythrityl tetrakis[3-(3,5-di-tert-butyl-4-hydroxyphenyl)propionate], and N,N'-hexamethylene-bis-3,5-di-tert-butyl-4-hydroxyhydrocinnamide (Irganox® 1098), and the product Irganox® 245 described above from Ciba Geigy, which has particularly good suitability.

The amount comprised of the antioxidants D), which can be used individually or as a mixture, is from 0.05 up to 3% by weight, preferably from 0.1 to 1.5% by weight, in particular from 0.1 to 1% by weight, based on the total weight of the molding compositions A) to D).

In some instances, sterically hindered phenols having not more than one sterically hindered group in ortho-position with respect to the phenolic hydroxy group have proven particularly advantageous; in particular when assessing color-fastness on storage in diffuse light over prolonged periods.

The molding compositions of the invention can comprise, as component D4), from 0.05 to 5% by weight, preferably from 0.1 to 2% by weight, and in particular from 0.25 to 1% by weight, of a nigrosin.

Nigrosins are generally a group of black or gray phenazine dyes (azine dyes) related to the indulines and taking various forms (water-soluble, oleosoluble, spirit-soluble), used in wool dyeing and wool printing, in black dyeing of silks, and in the coloring of leather, of shoe creams, of varnishes, of plastics, of stoving lacquers, of inks, and the like, and also as microscopy dyes.

Nigrosins are obtained industrially via heating of nitrobenzene, aniline, and aniline hydrochloride with metallic iron and $FeCl_3$ (the name being derived from the Latin niger=black).

Component D4) can be used in the form of free base or else in the form of salt (e.g. hydrochloride).

Further details concerning nigrosins can be found by way of example in the electronic encyclopedia Römpp Online, Version 2.8, Thieme-Verlag Stuttgart, 2006, keyword "Nigrosin".

Examples of other conventional additives D) are amounts of up to 25% by weight, preferably up to 20% by weight, of elastomeric polymers (also often termed impact modifiers, elastomers, or rubbers).

These are very generally copolymers preferably composed of at least two of the following monomers: ethylene, propylene, butadiene, isobutene, isoprene, chloroprene, vinyl acetate, styrene, acrylonitrile and acrylates and/or methacrylates having from 1 to 18 carbon atoms in the alcohol component.

Polymers of this type are described, for example, in Houben-Weyl, Methoden der organischen Chemie, Vol. 14/1 (Georg-Thieme-Verlag, Stuttgart, Germany, 1961), pages 392-406, and in the monograph by C. B. Bucknall, "Toughened Plastics" (Applied Science Publishers, London, UK, 1977).

Some preferred types of such elastomers are described below.

Preferred types of such elastomers are those known as ethylene-propylene (EPM) and ethylene-propylene-diene (EPDM) rubbers.

EPM rubbers generally have practically no residual double bonds, whereas EPDM rubbers may have from 1 to 20 double bonds per 100 carbon atoms.

Examples which may be mentioned of diene monomers for EPDM rubbers are conjugated dienes, such as isoprene and butadiene, non-conjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenyl-norbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[5.2.1.0$^{2,6}$]-3,8-decadiene, and mixtures of these. Preference is given to 1,5-hexadiene, 5-ethylidenenorbornene and dicyclopentadiene. The diene content of the EPDM rubbers is preferably from 0.5 to 50% by weight, in particular from 1 to 8% by weight, based on the total weight of the rubber.

EPM rubbers and EPDM rubbers may preferably also have been grafted with reactive carboxylic acids or with derivatives of these. Examples of these are acrylic acid, methacrylic acid and derivatives thereof, e.g. glycidyl (meth)acrylate, and also maleic anhydride.

Copolymers of ethylene with acrylic acid and/or methacrylic acid and/or with the esters of these acids are another group of preferred rubbers. The rubbers may also comprise dicarboxylic acids, such as maleic acid and fumaric acid, or derivatives of these acids, e.g. esters and anhydrides, and/or monomers comprising epoxy groups. These monomers comprising dicarboxylic acid derivatives or comprising epoxy groups are preferably incorporated into the rubber by adding to the monomer mixture monomers comprising dicarboxylic acid groups and/or epoxy groups and having the general formulae I or II or III or IV

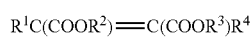  (I)

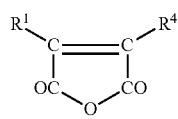  (II)

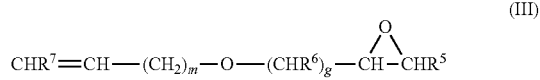  (III)

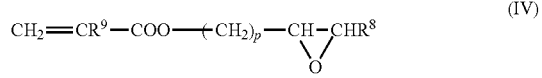  (IV)

where $R^1$ to $R^9$ are hydrogen or alkyl groups having from 1 to 6 carbon atoms, and m is a whole number from 0 to 20, g is a whole number from 0 to 10 and p is a whole number from 0 to 5.

The radicals $R^1$ to $R^9$ are preferably hydrogen, where m is 0 or 1 and g is 1. The corresponding compounds are maleic acid, fumaric acid, maleic anhydride, allyl glycidyl ether and vinyl glycidyl ether.

Preferred compounds of the formulae I, II and IV are maleic acid, maleic anhydride and (meth)acrylates comprising epoxy groups, such as glycidyl acrylate and glycidyl methacrylate, and the esters with tertiary alcohols, such as tert-butyl acrylate. Although the latter have no free carboxy groups, their behavior approximates to that of the free acids and they are therefore termed monomers with latent carboxy groups.

The copolymers are advantageously composed of from 50 to 98% by weight of ethylene, from 0.1 to 20% by weight of monomers comprising epoxy groups and/or methacrylic acid and/or monomers comprising anhydride groups, the remaining amount being (meth)acrylates.

Particular preference is given to copolymers composed of
from 50 to 98% by weight, in particular from 55 to 95% by weight, of ethylene,
from 0.1 to 40% by weight, in particular from 0.3 to 20% by weight, of glycidyl acrylate and/or glycidyl methacrylate, (meth)acrylic acid and/or maleic anhydride, and
from 1 to 45% by weight, in particular from 5 to 40% by weight, of n-butyl acrylate and/or 2-ethylhexyl acrylate.

Other preferred (meth)acrylates are the methyl, ethyl, propyl, isobutyl and tert-butyl esters.

Comonomers which may be used alongside these are vinyl esters and vinyl ethers.

The ethylene copolymers described above may be prepared by processes known per se, preferably by random copolymerization at high pressure and elevated temperature. Appropriate processes are well-known.

Other preferred elastomers are emulsion polymers whose preparation is described, for example, by Blackley in the monograph "Emulsion Polymerization". The emulsifiers and catalysts which can be used are known per se.

In principle it is possible to use homogeneously structured elastomers or else those with a shell structure. The shell-type structure is determined by the sequence of addition of the individual monomers. The morphology of the polymers is also affected by this sequence of addition.

Monomers which may be mentioned here, merely as examples, for the preparation of the rubber fraction of the elastomers are acrylates, such as n-butyl acrylate and 2-ethylhexyl acrylate, corresponding methacrylates, butadiene and isoprene, and also mixtures of these. These monomers may be copolymerized with other monomers, such as styrene, acrylonitrile, vinyl ethers and with other acrylates or methacrylates, such as methyl methacrylate, methyl acrylate, ethyl acrylate or propyl acrylate.

The soft or rubber phase (with a glass transition temperature of below 0° C.) of the elastomers may be the core, the outer envelope or an intermediate shell (in the case of elastomers whose structure has more than two shells). Elastomers having more than one shell may also have more than one shell composed of a rubber phase.

If one or more hard components (with glass transition temperatures above 20° C.) are involved, besides the rubber phase, in the structure of the elastomer, these are generally prepared by polymerizing, as principal monomers, styrene, acrylonitrile, methacrylonitrile, α-methylstyrene, p-methylstyrene, or acrylates or methacrylates, such as methyl acrylate, ethyl acrylate or methyl methacrylate. Besides these, it is also possible to use relatively small proportions of other comonomers.

It has proven advantageous in some cases to use emulsion polymers which have reactive groups at their surfaces. Examples of groups of this type are epoxy, carboxy, latent carboxy, amino and amide groups, and also functional groups which may be introduced by concomitant use of monomers of the general formula

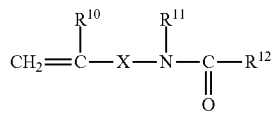

where the substituents can be defined as follows:
$R^{10}$ is hydrogen or a $C_1$-$C_4$-alkyl group,
$R^{11}$ is hydrogen, a $C_1$-$C_8$-alkyl group or an aryl group, in particular phenyl,
$R^{12}$ is hydrogen, a $C_1$-$C_{10}$-alkyl group, a $C_6$-$C_{12}$-aryl group, or —$OR^{13}$,
$R^{13}$ is a $C_1$-$C_8$-alkyl group or a $C_6$-$C_{12}$-aryl group, which can optionally have substitution by groups that comprise O or by groups that comprise N,
X is a chemical bond, a $C_1$-$C_{10}$-alkylene group, or a $C_6$-$C_{12}$-arylene group, or

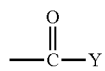

Y is O—Z or NH—Z, and
Z is a $C_1$-$C_{10}$-alkylene or $C_6$-$C_{12}$-arylene group.

The graft monomers described in EP-A 208 187 are also suitable for introducing reactive groups at the surface.

Other examples which may be mentioned are acrylamide, methacrylamide and substituted acrylates or methacrylates, such as (N-tert-butylamino)ethyl methacrylate, (N,N-dimethylamino)ethyl acrylate, (N,N-dimethylamino)methyl acrylate and (N,N-diethylamino)ethyl acrylate.

The particles of the rubber phase may also have been crosslinked. Examples of crosslinking monomers are 1,3-butadiene, divinylbenzene, diallyl phthalate and dihydrodicyclopentadienyl acrylate, and also the compounds described in EP-A 50 265.

It is also possible to use the monomers known as graftlinking monomers, i.e. monomers having two or more polymerizable double bonds which react at different rates during the polymerization. Preference is given to the use of compounds of this type in which at least one reactive group polymerizes at about the same rate as the other monomers, while the other reactive group (or reactive groups), for example, polymerize(s) significantly more slowly. The different polymerization rates give rise to a certain proportion of unsaturated double bonds in the rubber. If another phase is then grafted onto a rubber of this type, at least some of the double bonds present in the rubber react with the graft monomers to form chemical bonds, i.e. the phase grafted on has at least some degree of chemical bonding to the graft base.

Examples of graft-linking monomers of this type are monomers comprising allyl groups, in particular allyl esters of ethylenically unsaturated carboxylic acids, for example allyl acrylate, allyl methacrylate, diallyl maleate, diallyl fumarate and diallyl itaconate, and the corresponding monoallyl compounds of these dicarboxylic acids. Besides these there is a wide variety of other suitable graft-linking monomers. For further details reference may be made here, for example, to U.S. Pat. No. 4,148,846.

The proportion of these crosslinking monomers in the impact-modifying polymer is generally up to 5% by weight, preferably not more than 3% by weight, based on the impact-modifying polymer.

Some preferred emulsion polymers are listed below. Mention may first be made here of graft polymers with a core and with at least one outer shell, and having the following structure:

| Type | Monomers for the core | Monomers for the envelope |
|---|---|---|
| I | 1,3-butadiene, isoprene, n-butyl acrylate, ethylhexyl acrylate, or a mixture of these | styrene, acrylonitrile, methyl methacrylate |
| II | as I, but with concomitant use of crosslinking agents | as I |
| III | as I or II | n-butyl acrylate, ethyl acrylate, methyl acrylate, 1,3-butadiene, isoprene, ethylhexyl acrylate |
| IV | as I or II | as I or III, but with concomitant use of monomers having reactive groups, as described herein |
| V | styrene, acrylonitrile, methyl methacrylate, or a mixture of these | first envelope composed of monomers as described under I and II for the core, second envelope as described under I or IV for the envelope |

Instead of graft polymers whose structure has more than one shell, it is also possible to use homogeneous, i.e. single-shell, elastomers composed of 1,3-butadiene, isoprene and n-butyl acrylate or of copolymers of these. These products, too, may be prepared by concomitant use of crosslinking monomers or of monomers having reactive groups.

Examples of preferred emulsion polymers are n-butyl acrylate-(meth)acrylic acid copolymers, n-butyl acrylate-glycidyl acrylate or n-butyl acrylate-glycidyl methacrylate copolymers, graft polymers with an inner core composed of n-butyl acrylate or based on butadiene and with an outer envelope composed of the abovementioned copolymers, and copolymers of ethylene with comonomers which supply reactive groups.

The elastomers described may also be prepared by other conventional processes, e.g. by suspension polymerization.

Preference is also given to silicone rubbers, as described in DE-A 37 25 576, EP-A 235 690, DE-A 38 00 603 and EP-A 319 290.

It is, of course, also possible to use mixtures of the types of rubber listed above.

The thermoplastic molding compositions of the invention can comprise, as component D), conventional processing aids, such as stabilizers, oxidation retarders, agents to counteract decomposition by heat and decomposition by ultraviolet light, lubricants and mold-release agents, colorants, such as dyes and pigments, nucleating agents, plasticizers, etc.

Examples of oxidation retarders and heat stabilizers are sterically hindered phenols and/or phosphites and amines (e.g. TAD), hydroquinones, aromatic secondary amines, such as diphenylamines, various substituted members of these groups, and mixtures of these, in concentrations of up to 1% by weight, based on the weight of the thermoplastic molding compositions.

UV stabilizers that may be mentioned, the amounts of which used are generally up to 2% by weight, based on the molding composition, are various substituted resorcinols, salicylates, benzotriazoles, and benzophenones.

Materials that can be added as colorants are inorganic pigments, such as titanium dioxide, ultramarine blue, iron oxide, and carbon black, and also organic pigments, such as phthalocyanines, quinacridones, perylenes, and also dyes, such as anthraquinones.

Materials that can be used as nucleating agents are sodium phenylphosphinate, aluminum oxide, silicon dioxide, and also preferably talc.

The thermoplastic molding compositions of the invention can be produced by processes known per se, by mixing the starting components in conventional mixing apparatus, such as screw-based extruders, Brabender mixers, or Banbury mixers, and then extruding the same. The extrudate can be cooled and pelletized. It is also possible to premix individual components and then to add the remaining starting materials individually and/or likewise in the form of a mixture. The mixing temperatures are generally from 230 to 320° C.

In another preferred mode of operation, components B) to C) and also optionally D) can be mixed with a prepolymer, compounded, and pelletized. The resultant pellets are then solid-phase condensed under an inert gas continuously or batchwise at a temperature below the melting point of component A) until the desired viscosity has been reached.

The thermoplastic molding compositions of the invention feature good processability together with good mechanical properties, and also markedly improved weld line strength and thermal stability.

These materials are suitable for the production of fibers, foils, and moldings of any type. Some examples follow: cylinder head covers, motorcycle covers, intake manifolds, charge-air-cooler caps, plug connectors, gearwheels, cooling-fan wheels, and cooling-water tanks.

In the electrical and electronic sector, improved-flow polyamides can be used to produce plugs, plug parts, plug connectors, membrane switches, printed circuit board modules, microelectronic components, coils, I/O plug connectors, plugs for printed circuit boards (PCBs), plugs for flexible printed circuits (FPCs), plugs for flexible integrated circuits (FFCs), high-speed plug connectors, terminal strips, connector plugs, device connectors, cable-harness components, circuit mounts, circuit-mount components, three-dimensionally injection-molded circuit mounts, electrical connectors, and mechatronic components.

Possible uses in automobile interiors are for dashboards, steering-column switches, seat components, headrests, center consoles, gearbox components, and door modules, and possible uses in automobile exteriors are for door handles, exterior-mirror components, windshield-wiper components, windshield-wiper protective housings, grilles, roof rails, sunroof frames, engine covers, cylinder-head covers, intake pipes (in particular intake manifolds), windshield wipers, and also external bodywork components.

Possible uses of improved-flow polyamides in the kitchen and household sector are for the production of components for kitchen devices, e.g. fryers, smoothing irons, knobs, and also applications in the garden and leisure sector, e.g. components for irrigation systems, or garden devices, and door handles.

EXAMPLES

The following components were used:

Component A/1

Nylon-6,6 with intrinsic viscosity IV of 148 ml/g, measured on a 0.5% strength by weight solution in 96% strength by weight sulfuric acid at 25° C. to ISO 307. (Ultramid® A27 from BASF SE was used.)

Component B/1

Iron powder, CAS No. 7439-89-6:

| Fe | g/100 g | at least 97.7 | IR detection |
|----|---------|---------------|--------------|
| C  | g/100 g | at most 1.0   | IRS          |
| N  | g/100 g | at most 1.0   | TCD          |
| O  | g/100 g | at most 0.6   | IRS          |

Particle size distribution: (laser scattering with Beckmann LS13320)

$d_{10}$ from 1.4 to 2.7 μm $d_{50}$ from 3.4 to 5.2 μm $d_{90}$ from 6.4 to 9.2 μm BET surface area 0.44 m$^2$/g (DIN ISO 9277)

Component C

2:1 mixture of aluminum diethylphosphinate and melamine polyphosphate, with 5% of zinc borate (Exolit® OP1312 from Clariant GmbH)

Component D/1

Glass fibers

Component D/2

Al di/tristearates (Alugel® 30 DF from Baerlocher)

Component D/31

CuI/KI in ratio 1:4 (20% strength masterbatch in PA6)

Component D/32

Irganox® 1098 from BASF SE

The molding compositions were produced in a ZSK 26 with throughput 25 kg/h and a flat temperature profile at about 280° C.

The following measurements were made:

Tensile to ISO 527, mechanical properties prior to and after heat-aging at 200° C. in a convection oven;

IV: c=5 g/l in 96% strength sulfuric acid, to ISO 307

Flame retardancy properties to UL 94

The tables give the constitutions of the molding compositions and the results of the measurements.

TABLE 1

Constitutions

| | Components [% by wt.] | | | | | | |
|---|---|---|---|---|---|---|---|
| Ex. | A/1 | B/1 | C | D/1 | D/2 | D/31 | D/32 |
| 1comp | 54.6 | — | 20 | 25 | 0.2 | — | 0.2 |
| 2 | 53.6 | 1 | 20 | 25 | 0.2 | — | 0.2 |
| 3 | 53.3 | 1 | 20 | 25 | 0.2 | 0.3 | 0.2 |

TABLE 2

Mechanical properties

| | Tensile strength (tensile stress at break) | | | | |
|---|---|---|---|---|---|
| Ex. | 0 h | 250 h | 500 h | 750 h | 1000 h |
| 1comp | 152 | 125 | 101 | 74 | 46 |
| 2 | 139 | 120 | 101 | 83 | 71 |
| 3 | 135 | 125 | 115 | 95 | 79 |

| | Elongation at break (tensile strain at break) | | | | |
|---|---|---|---|---|---|
| Ex. | 0 h | 250 h | 500 h | 750 h | 1000 h |
| 1comp | 2.97 | 2.10 | 1.30 | 0.91 | 0.68 |
| 2 | 2.79 | 2.40 | 1.58 | 1.29 | 1.37 |
| 3 | 2.57 | 2.50 | 1.88 | 1.55 | 1.36 |

TABLE 3

UL 94 flame retardancy

| Ex. | Thickness 1.6 mm |
|---|---|
| 1 comp | V0 |
| 2 | V1 |
| 3 | V0 |

The invention claimed is:

1. A thermoplastic molding composition comprising
A) from 10 to 98% by weight of a polyamide,
B) from 0.001 to 20% by weight of iron powder with a particle size of at most 10 μm ($d_{50}$ value) and with a specific BET surface area of from 0.1 to 5 m²/g to DIN ISO 9277,
C) from 1 to 40% by weight of a halogen-free flame retardant from the group of the phosphorus- or nitrogen-containing compounds or P—N condensates, or a mixture of these and
D) from 0 to 70% by weight of further additives,
where the total of the percentages by weight of components A) to D) does not exceed 100%.

2. The thermoplastic molding composition according to claim 1, comprising, as component D3), from 0.05 to 3% by weight of a copper stabilizer or of a sterically hindered phenol, or a mixture of these.

3. The thermoplastic molding composition according to claim 1, in which component B) has a $d_{10}$ value of from 1 to 5 μm.

4. The thermoplastic molding composition according to claim 1, in which component B) has a $d_{90}$ value of from 3 to 35 μm.

5. The thermoplastic molding composition according to claim 1, in which the C content of component B) is from 0.05 to 1.2 g/100 g (to ASTM E1019).

6. The thermoplastic molding composition according to claim 1, in which component B) is obtainable via thermal decomposition of pentacarbonyliron.

7. The thermoplastic molding composition according to claim 1, in which component B) has a tap density of from 2.5 to 5 g/cm³.

8. The thermoplastic molding composition according to claim 2, in which component B) has a $d_{10}$ value of from 1 to 5 μm,
a $d_{90}$ value of from 3 to 35 μm,
a tap density of from 2.5 to 5 g/cm³ and
in which the C content of component B) is from 0.05 to 1.2 g/100 g (to ASTM E1019).

9. The thermoplastic molding composition according to claim 8, in which component B) is obtainable via thermal decomposition of pentacarbonyliron.

10. The thermoplastic molding composition according to claim 1, in which component C) is composed of phosphinic salts of the formula (I) and/or diphosphinic salts of the formula (II), and/or of polymers of these

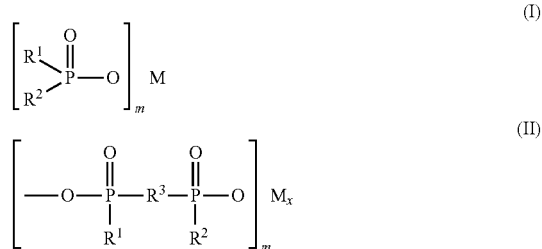

where the definitions of the substituents are as follows:
$R^1$ and $R^2$ are hydrogen or $C_1$-$C_8$-alkyl, where at least one radical $R^1$ or $R^2$ is hydrogen;
$R^3$ is $C_1$-$C_{10}$-alkylene;
arylene;
alkylarylene; or
arylalkylene;
M is an alkaline earth metal, alkali metal, Al, Zn, Fe, or boron;
m is a whole number from 1 to 3;
n is a whole number of 1 and 3, and
x is 1 or 2.

11. The thermoplastic molding composition according to claim 9, in which component C) is composed of phosphinic salts of the formula (I) and/or diphosphinic salts of the formula (II), and/or of polymers of these

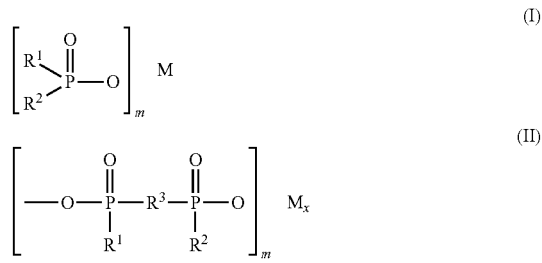

where the definitions of the substituents are as follows:
$R^1$ and $R^2$ are hydrogen or $C_1$-$C_8$-alkyl, where at least one radical $R^1$ or $R^2$ is hydrogen;
$R^3$ is $C_1$-$C_{10}$-alkylene;
arylene;
alkylarylene; or
arylalkylene;
M is an alkaline earth metal or alkali metal, Al, Zn, Fe, boron;
m is a whole number from 1 to 3;
n is a whole number of 1 and 3, and
x is 1 or 2.

12. The thermoplastic molding composition according to claim 10, wherein

R¹ and R² are hydrogen or $C_1$-$C_4$-alkyl, where at least one radical R¹ or R² is hydrogen, R³ is methylene, ethylene, n-propylene, isopropylene, n-butylene, tert-butylene, n-pentylene, n-octylene, n-dodecylene, phenylene, naphthylene, methylphenylene, ethylphenylene, tert-butylphenylene, methylnaphthylene, ethylnaphthylene, tert-butylnaphthylene, phenylmethylene, phenylethylene, phenylpropylene or phenylbutylene.

13. The thermoplastic molding composition according to claim 10, wherein R¹ and R² are hydrogen and R³ is methylene, ethylene, n-propylene, isopropylene, n-butylene, tert-butylene, n-pentylene, n-octylene, n-dodecylene, phenylene, naphthylene, methylphenylene, ethylphenylene, tert-butylphenylene, methylnaphthylene, ethylnaphthylene, tert-butylnaphthylene, phenylmethylene, phenylethylene, phenylpropylene or phenylbutylene.

14. The thermoplastic molding composition according to claim 11, wherein R¹ and R² are hydrogen and R³ is methylene, ethylene, n-propylene, isopropylene, n-butylene, tert-butylene, n-pentylene, n-octylene, n-dodecylene, phenylene, naphthylene, methylphenylene, ethylphenylene, tert-butylphenylene, methylnaphthylene, ethylnaphthylene, tert-butylnaphthylene, phenylmethylene, phenylethylene, phenylpropylene or phenylbutylene.

15. The thermoplastic molding composition according to claim 10, wherein R¹ and R² are hydrogen, methyl, ethyl, n-propyl, isopropyl, n-butyl, tert-butyl, n-pentyl; phenyl; where at least one radical R¹ or R² is hydrogen.

16. A process for the production of a fiber, foil, and molding which comprises utilizing the thermoplastic molding composition according to claim 1.

17. A fiber, a foil, or a molding, obtainable from the thermoplastic molding composition according to claim 1.

* * * * *